United States Patent
Becue et al.

(10) Patent No.: US 6,797,247 B2
(45) Date of Patent: *Sep. 28, 2004

(54) MATERIAL WITH A CHANNEL STRUCTURE FOR ELIMINATING OXIDES OF NITROGEN

(75) Inventors: Thierry Becue, Paris (FR); Gil Mabilon, Carrieres sur Seine (FR); Philippe Villeret, Rueil Malmaison (FR)

(73) Assignee: Institut Francais du Petrole, Rueil Malmaison Cedex (FR)

(*) Notice: Subject to any disclaimer, the term of this patent is extended or adjusted under 35 U.S.C. 154(b) by 117 days.

This patent is subject to a terminal disclaimer.

(21) Appl. No.: 10/141,785

(22) Filed: May 10, 2002

(65) Prior Publication Data

US 2003/0091499 A1 May 15, 2003

Related U.S. Application Data

(63) Continuation-in-part of application No. 09/707,772, filed on Nov. 8, 2000, now Pat. No. 6,551,564.

(30) Foreign Application Priority Data

Nov. 10, 1999 (FR) .......................................... 99 14144

(51) Int. Cl.⁷ .............................................. B01D 53/56
(52) U.S. Cl. ............................... 423/239.1; 423/213.2; 423/213.5; 423/592
(58) Field of Search .......................... 423/213.2, 213.5, 423/239.1, 592, 593, 605, 608, 625, 632

(56) References Cited

U.S. PATENT DOCUMENTS

| | | | |
|---|---|---|---|
| 5,340,562 A | 8/1994 | O'Young et al. | |
| 5,756,057 A | 5/1998 | Tsuchitani et al. | |
| 5,800,793 A | 9/1998 | Cole | |
| 5,898,015 A | 4/1999 | Yokoi et al. | |
| 6,001,319 A | * 12/1999 | Yokoi et al. | ............. 423/239.1 |

FOREIGN PATENT DOCUMENTS

EP 0710622 5/1996

* cited by examiner

Primary Examiner—Stanley S. Silverman
Assistant Examiner—Maribel Medina
(74) Attorney, Agent, or Firm—Millen White Zelano & Branigan P.C.

(57) ABSTRACT

The invention concerns materials for eliminating oxides of nitrogen NO and $NO_2$ present in exhaust gases, in particular from the internal combustion engines of automotive vehicles operating in a medium that is super-stoichiometric in oxidizing agents, which can adsorb oxides of nitrogen then desorb the oxides of nitrogen by elevating the temperature with respect to the adsorption temperature or by passage of a rich mixture, the materials comprising mixed oxides the metals of which are in octahedral co-ordination, with the octahedra connecting together so that the structure generates micropores in the form of channels. The channel width of the materials is such that the sides are composed of 2 and/or 3 octahedra. These materials adsorb oxides of nitrogen by insertion and do not become poisoned in contact with oxides of sulfur and carbon contained in the gases. In the presence of a group VIII metal or another suitable element such as iron, zinc or aluminum, these materials are capable of eliminating oxides of nitrogen adsorbed by reduction during passage of a rich mixture.

27 Claims, 1 Drawing Sheet

MATERIAL WITH A CHANNEL STRUCTURE FOR ELIMINATING OXIDES OF NITROGEN

CROSS-REFERENCE TO RELATED APPLICATION

This application is a continuation-in-part of application Ser. No. 09/707,772, U.S. Pat. No. 6,551,564 filed Nov. 8, 2000.

TECHNICAL FIELD

The present invention relates to materials that encourage elimination, by adsorption, of oxides of nitrogen (NO and $NO_2$, usually termed $NO_x$) present in a gas mixture which may be super-stoichiometric in oxidising compounds, and in particular in oxygen, said materials not being poisoned by the sulphur-containing products present in those gases. The invention is applicable to eliminating oxides of nitrogen ($NO_x$) present in the exhaust gases from automotive vehicles, in particular from vehicles functioning with diesel fuel.

BACKGROUND OF THE INVENTION

The high toxicity of oxides of nitrogen and their role in the formation of acid rain and tropospheric ozone have led to the instigation of strict regulations limiting the discharge of such compounds. In order to satisfy those regulations, it is generally necessary to eliminate at least a portion of such oxides present in exhaust gases from automotive or stationary engines and from turbines.

The elimination of oxides of nitrogen by thermal decomposition or, as is preferable, by catalytic decomposition can be envisaged, but the high temperatures demanded by this reaction are incompatible with those of the exhaust gases. Only catalytic reduction of oxides of nitrogen to nitrogen is possible using the reducing agents which are present, albeit in small quantities, in the exhaust gases (CO, $H_2$, unburned hydrocarbons or where combustion in the engine has been imperfect), and also by injecting a complement to those reducing compounds upstream of the catalyst. Such reducing agents are hydrocarbons, alcohols, ethers or other oxygen-containing compounds; they can also be a liquid or gaseous fuel (under pressure, CNG, or liquefied, LPG) feeding the engine or turbine.

European patent EP-A1-0 540 280 describes an apparatus for reducing emissions of oxides of nitrogen in the exhaust gases from internal combustion engines, which comprises a material for adsorbing and desorbing oxides of nitrogen. In that process, the oxides of nitrogen are stored in the form of nitrates when the engine is burning lean, i.e., depleted in hydrocarbons. However, the storage capacity of a trap operating using that principle is generally deteriorated by adsorption of sulphur-containing products contained in the exhaust gas, which form sulphates that are more stable than the nitrates, poisoning the trap.

Further, following $NO_x$ trapping, a step for desorbing the oxides of nitrogen must be carried out followed by their reduction. Devices for catalysed oxidation treatment of carbon monoxide CO and hydrocarbons HC contained in the exhaust gases are known which, for example, use catalysts for reducing oxides of nitrogen, known as $DeNO_x$ catalysts, which are active for reducing $NO_x$ in temperature ranges in the range 200° C. to 350° C. and which comprise, for example, precious metals on oxide supports such as platinum or palladium deposited on an alumina, titanium oxide or zirconium support, or by perovskites, or in temperature ranges in the range 350° C. to 600° C. comprising, for example, hydrothennally stable zeolites (for example Cu-ZSM5). A device for treating exhaust gases from a compression ignition engine comprising a catalyst and an oxides of nitrogen adsorbent placed in the exhaust collector has been described, for example, in patents EP-A1-0 540 280 and EP-A1-0 718 478.

Thus, a material behaving as a trap for oxides of nitrogen has to be capable of adsorbing the oxides of nitrogen at low temperatures up to the temperature necessary for the $NO_x$ reduction catalyst to function, the trap then allowing the oxides of nitrogen coming into contact with the $DeNO_x$ catalyst to desorb at a temperature sufficient to trigger the $NO_x$ reduction reaction.

Oxides with a crystallographic structure that generates channels with a size sufficient to accommodate oxides of nitrogen have been described (Japanese patents JP09075715A and JP09075718A). The solids used in those patents are mixed oxides with the crystallographic structure of hollandite and specific formulations $K_{3.6}Zn_{1.8}Sn_{6.2}O_{16}$ and $K_{1.8}A_{1.8}Sn_{6.2}O_{16}$.

French patent FR-A-2 733 924 describes a material with formula $YBa_2Cu_3O_{7-x}$ which can integrate the oxides of nitrogen in the mixed oxide composing the material. That patent indicates that the material, after being charged with oxides of nitrogen, is transformed by passing from an orthorhombic structure that is rich in oxygen to a tetragonal structure that is depleted in oxygen when the oxygen content of the gas reduces, and that phase transition causes desorption of oxides of nitrogen. According to that process, it is possible to influence adsorption and desorption of the oxides of nitrogen by varying the amounts of oxygen in the exhaust gases. It has recently been demonstrated (K-Y Lee, K. Watanabe, M. Misono, Applied Catalysis B 13, 241 (1997)) that the adsorption of $NO_x$ in the presence of oxygen on the material $YBa_2Cu_3O_{7-x}$ leads to the formation of barium nitrate species $(Ba(NO_3)_2)$. That same study also showed that that material suffers a dramatic loss of its oxides of nitrogen adsorption properties in the presence of carbon dioxide by forming barium carbonates. Since barium sulphate species are more stable than the nitrate species, it is feared that a compound of the $YBa_2Cu_3O_{7-x}$ type is also poisoned in the presence of sulphur dioxide by forming sulphate species on the oxides of nitrogen adsorption sites.

The materials of the present patent can be found in the natural state or they can be synthesised in the laboratory. EP-A-0 623 556 and EP-A-0 710 622, for example, describe methods for producing certain of such solids. Further, among such solids, materials based on manganese and with channels with sufficient diameters for inserting $NO_x$ have been described in the Gmelin Handbook (Gmelin Handbook of Inorganic and Organometallic Chemistry, Mn n° 56, A5b1, Springer-Verlag, 1996).

SUMMARY OF THE INVENTION

The invention concerns materials for eliminating oxides of nitrogen NO and $NO_2$ ($NO_x$) in particular those present in exhaust gases, for example internal combustion engines of automotive vehicles operating in a medium which is super-stoichiometric in oxidising agents, said materials being capable of adsorbing $NO_x$ and which can desorb $NO_x$ by raising the temperature or by treatment with a mixture that is rich in reducing agents. The materials are mixed oxides the framework of which is constituted by metal cations M each surrounded by 6 oxygen atoms and wherein the octahedra ($MO_6$) thus formed are connected together by edges and peaks generating a structure that produces channels in at least one direction in space. Said materials are of the OMS structure type with a hollandite (OMS 2*2), romanechite (OMS 2*3) or todorokite (OMS 3*3) type structure.

The material of the invention can trap oxides of nitrogen at low temperatures and desorb them at the temperature at which a $DeNO_x$ catalyst is capable of reducing them. These materials are insensitive to the oxides of sulphur and carbon contained in the exhaust gases, which prevents the materials from being poisoned. The materials adsorb oxides of nitrogen over a wide temperature range while desorption is carried out in a very narrow temperature range, which means that thermal regeneration is easy to control. During desorption, the oxides of nitrogen that have been adsorbed are released in bursts with a high $NO_x$ concentration, which is beneficial to the reaction kinetics for reduction of the desorbed oxides of nitrogen. The kinetics of the reduction of $NO_x$ by hydrocarbons are positive with respect to the oxides of nitrogen species. Said material does not have a basic oxide phase that substantially stabilises the oxides of nitrogen and oxides of sulphur into the nitrate and sulphate forms respectively. The $SO_x$ that can be inserted with the $NO_x$ into the structure of the material of the invention are desorbed in a temperature range that is similar to that of the $NO_x$. Preventing the formation of stable sulphates ensures that poisoning of the adsorbing material is minimal, meaning that the regeneration frequency and the regeneration temperature are lower, and thus the service life of the $NO_x$ trap is longer, and there an energy gain.

The material of the invention can also allow chemical desorption by varying the chemical composition of the gas containing the oxides of nitrogen. In a particular implementation of the invention, combining the materials claimed by the Applicant with a metal from group VIII or a suitable metal such as iron, zinc or aluminium eliminates adsorbed $NO_x$ by reduction during passage of a rich mixture.

The present invention concerns materials for adsorbing and desorbing oxides of nitrogen the structure of which is composed of octahedra ($MO_6$), M being selected from elements from groups IIIB to IIIA in the periodic table. Preferably, this element (M) has an oxidation number of close to 4. Said material has a characteristic structure that generates channels into which the $NO_x$ can insert at low temperatures and leave at a higher temperature. The sides of these channels are formed by linking the octahedra ($MO_6$), which connect together by the edges, these sides connecting themselves together via the peaks of the octahedra. Thus, the width of the channels can vary depending on the mode of preparation, depending on whether the sides are composed of 2 and/or 3 octahedra ($MO_6$). This type of material is known by its acronym OMS, Octahedral Molecular Sieves. In accordance with the invention, the materials are selected so that they have a structure that generates channels either with a square cross section composed of two octahedra by two octahedra (OMS 2*2) or three octahedra by three octahedra (OMS 3*3), or with a rectangular cross section composed of two octahedra by three octahedra (OMS 2*3). The materials are selected from materials with a hollandite (OMS 2*2), romanechite (OMS 2*3) or todorokite (OMS 3*3) type structure.

More precisely, the adsorbing phase of materials with type OMS 2*2, OMS 2*3 and OMS 3*3 of the invention have a three-dimensional structure that generates channels in at least one direction in space. Said phase is composed of octahedra ($MO_6$) and comprises:

at least one element (M) selected from the group formed by elements from groups IIIB, IVB, VB, VIB, VIIB, VIII, IB, IIB, IIIA of the periodic table and germanium, each element M being coordinated with 6 oxygen atoms, and located at the centre of the oxygen octahedra;

at least one element (B) selected from the group formed by the alkali elements IA, the alkaline-earth elements IIA, the rare earths IIIB, transition metals or elements from groups IIIA and IVA, element B generally being located in channels in the oxide structure.

Particularly preferred materials of the invention of type OMS2*2, OMS2*3 and OMS 3*3 that can be used to eliminate oxides of nitrogen are materials with type OMS2*2.

Preferably, the octahedra contain no tin.

More particularly, elements M are selected from scandium, yttrium, lanthanum, titanium, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, aluminium, gallium, indium, and mixtures of at least two of these elements.

The average charge (oxidation number) carried by the cation or cations M from groups IIIB to IIIA is preferably about +4. At least the major portion of elements (M) is preferably selected from elements in the group constituted by manganese, titanium, aluminium, zinc, copper, zirconium, iron and mixtures of at least two of these elements. Highly preferably, the major portion of elements (M) is selected from manganese, titanium, zirconium and mixtures of at least two of these elements.

Other elements M from groups IIIB to IIIA can be added in minor quantities as dopants. Preferably, the elements from groups IIIB to IIIA added in minor quantities are selected from manganese, molybdenum, aluminium, zinc, copper, nickel, cobalt, iron, chromium, scandium, yttrium, gallium, cadmium and indium and mixtures of at least two of these elements, and more preferably selected from manganese, aluminium, zinc, copper, nickel, cobalt, gallium and mixtures of at least two of these elements. In particular, a manganese-titanium mixture is highly advantageous when the titanium is in the majority and the manganese is in the minority.

An element is in the majority when it satisfies the following formula: $(n_{maj}/\Sigma n_M) > 1/N$, where $n_M$ is the number of atoms of element (M) and N is the number of different elements (M) composing the framework, $n_{maj}$ being the highest number of atoms of element (M).

Elements (B) belong to the group formed by the alkali elements IA, alkaline-earth elements IIA, rare earth elements IIIB, transition metals and elements from groups IIIA and IVA. They are located in the channels of the material. Preferably, metal B is selected from the group formed by potassium, barium, strontium, iron, copper, zinc, aluminium, rubidium, magnesium and calcium and mixtures of at least two of these elements.

In one implementation of the invention, the material also comprises at least one metal (termed C) selected from the group formed by precious metals from the platinum family (group VIII). Elements (C) belong to the group formed by platinum, palladium, rhodium, ruthenium, iridium and osmium; preferably, platinum is selected. This implementation of the invention comprising at least one element (C) selected from noble metals from group VIII can oxidise NO to $NO_2$ and can also reduce the $NO_x$ subsequently during adsorption then desorption. This type of material of the invention can thus, surprisingly, carry out the three steps on a single material.

Other combinations of metals can also produce materials that can trap $NO_x$ and catalyse the reduction. This is particularly the case with materials with structure type OMS 2*2 in which the centres of the oxygen octahedra occupied by element (M) and/or the sites occupied by element (B) in channels of the oxide structure are occupied by elements with a different nature. In such a case, element (B) is at least partially preferentially selected from the group formed by alkali metals and alkaline-earth metals and element (M) is at least partially preferentially constituted by manganese. The sites that are not occupied by manganese and/or by the alkali metal or alkaline-earth metal can thus enable at least one element to be inserted, preferably selected from the group formed by transition metals and aluminium. Advantageous transition metals are iron, zinc, copper, nickel and cobalt. Iron and zinc are particularly preferred. As examples, materials with structure type OMS2*2 with formulae KZnMn, KFeMn or KAlMn carry out the steps of adsorption, desorption and reduction of $NO_x$, thus avoiding introducing a $NO_x$ reduction catalyst upstream of the $NO_x$ trap, or broadening the temperature efficiency window for the reduction reaction when used in combination with an element (C).

More particularly, the adsorbing phase of the invention has the following composition by weight, expressed as the percentage by weight with respect to the total mass of this active phase calcined at 1000° C. for 4 hours:

30% to 80% of at least one metal M, preferably 40% to 75%, highly preferably 45% to 70%;

0.01% to 30%, preferably 1.5% to 20%, of at least one element (B) selected from the group formed by alkali elements, alkaline-earth elements, rare earth elements, transition metals and elements from groups IIIA and IVA of the periodic table;

optionally, 0.05% to 5% of at least one metal (C) selected from the group formed by the precious metals from group VIII of the periodic table, the complement by weight being formed by the oxygen of the corresponding oxides.

A number of different methods exist for preparing such materials (S. L. Suib, C-L O'Young, "Synthesis of Porous Materials", M. L. Occelli, H. Kessler, eds, M. Dekker, Inc., p. 215, 1997). They may be synthesised by mixing and grinding solid inorganic precursors of metals M and B, followed by calcining. The materials can also be obtained by heating solutions of precursor salts to reflux, drying and calcining, by precipitating precursor salts by the sol-gel method, or by hydrothermal synthesis which consists of heating an aqueous solution containing the elements constituting the final material under autogenous pressure. The materials obtained from these syntheses can be modified by ion exchange or isomorphous substitution.

Optional metal (C) is introduced using any of the methods known to the skilled person: excess impregnation, dry impregnation, ion exchange, etc.

The material of the invention generally has a specific surface area in the range 1 to 300 $m^2/g$, preferably in the range 2 to 300 $m^2/g$, highly preferably in the range 30 to 250 $m^2/g$. The adsorption kinetics are better when the specific surface area is high, i.e., in the range 30 to 250 $m^2/g$.

The adsorbent phases can be in the form of a powder, beads, pellets or extrudates; they can also be deposited or directly prepared on monolithic supports of ceramic or metal. Advantageously, in order to increase the dispersion of the materials and thus to increase their capacity to adsorb $NO_x$, the materials can be deposited on porous supports with a high specific surface area such as silica or alumina before being formed (extrusion, coating . . . ). These supports are generally selected from the group formed by the following compounds: alumina (alpha, beta, delta, gamma, khi, or theta alumina), silicas ($SiO_2$), silica-aluminas, zeolites, titanium oxide ($TiO_2$), zirconium oxide ($ZrO_2$), magnesium oxide (MgO), divided carbides, for example silicon carbides (SiC), used alone or as a mixture. Mixed oxides or solid solutions comprising at least two of the above oxides can be added.

However, for use in a vehicle, it is usually preferable to use rigid supports (monoliths) with a large open porosity (more than 70%) to limit pressure drops that may cause high gas flow rates, and in particular high exhaust gas space velocities. These pressure drops are deleterious to proper functioning of the engine and contribute to reducing the efficiency of an internal combustion engine (gasoline or diesel). Further, the exhaust system is subjected to vibrations and to substantial mechanical and thermal shocks, so catalysts in the form of beads, pellets or extrudates run the risk of deterioration due to wear or fracturing.

Two techniques are used to prepare the catalysts of the invention on monolithic ceramic or metal supports (or substrates).

The first technique comprises direct deposition on the monolithic support, using a wash coating technique which is known to the skilled person, to coat the adsorbing phase prepared using the operating procedure described, for example, in the reference (S. L. Suib, C-L O'Young, "Synthesis of Porous Materials", M. L. Occelli, H. Kessler, eds, M. Dekker, Inc., p. 215, 1997). The adsorbent phase can be coated just after the co-precipitation step, hydrothermal synthesis step or heating under reflux step, the final calcining step being carried out on the phase deposited on the monolith, or the monolith can be coated after the material has been prepared in its final state, i.e., after the final calcining step.

The second technique comprises firstly depositing the inorganic oxide on the monolithic support then calcining the monolith between 500° C. and 1100° C. so that the specific surface area of this oxide is in the range 20 to 150 m²/g, then coating the monolithic substrate covered with the inorganic oxide with the adsorbent phase obtained after the steps described in the reference (S. L. Suib, C-L O'Young, "Synthesis of Porous Materials", M. L. Occelli, H. Kessler, eds, M. Dekker, Inc., p. 215, 1997).

Monolithic supports that can be used are:
either ceramic, where the principal elements can be alumina, zirconia, cordierite, mullite, silica, aluminosilicates or a combination of several of these compounds;
or a silicon carbide and/or nitride;
or aluminium titanate;
or metal, generally obtained from iron, chromium or aluminium alloys optionally doped with nickel, cobalt, cerium or yttrium.

The structure of the ceramic supports is that of a honeycomb, or they are in the form of a foam or fibres.

Metal supports can be produced by winding corrugated strips or by stacking corrugated sheets to constitute a honeycomb structure with straight or zigzag channels which may or may not communicate with each other. They can also be produced from metal fibres or wires which are interlocked, woven or braided.

With supports of metal comprising aluminium in their composition, it is recommended that they are pre-treated at high temperature (for example between 700° C. and 1100° C.) to develop a micro-layer of refractory alumina on the surface. This superficial micro-layer, with a porosity and specific surface area which is higher than that of the original metal, encourages adhesion of the active phase and protects the remainder of the support against corrosion.

The quantity of adsorbent phase deposited or prepared directly on the ceramic or metallic support (or substrate) is generally in the range 20 to 300 g per liter of said support, advantageously in the range 50 to 200 g per liter.

The materials of the invention can thus adsorb and desorb oxides of nitrogen present in the gases, in particular exhaust gases, and certain of these materials also have a reducing power as mentioned above.

These materials are characterized in that they are capable of adsorbing $NO_x$ at a temperature which is generally in the range 50° C. to 450° C., preferably in the range 100° C. to 350° C., more preferably in the range 150° C. to 300° C. Said oxides of nitrogen can be desorbed at a temperature generally in the range 250° C. to 500° C., preferably in the range 300° C. to 450° C. They can also be desorbed by varying the composition of the gas, for example by suddenly increasing the concentration of reducing compounds such as hydrocarbons, hydrogen, carbon monoxide, at temperatures in the range 150° C. to 500° C., preferably in the range 200° C. to 450° C., more preferably in the range 300° C. to 400° C. Thermally or chemically, oxides of nitrogen desorption can be triggered in temperature ranges were conventional $NO_x$ reduction catalysts are effective. Further, the thermal desorption of the invention can take place within narrow ranges of temperature generally within a range of 80° C. For diesel cars, the temperature of the exhaust gas is generally in the range 150° C. to 300° C. and rarely exceeds 500° C. The materials used in the process of the invention are thus suitable for adsorbing oxides of nitrogen present in the exhaust gases of stationary engines or, particularly, automotive diesel engines or spark ignition (lean burn) engines, but also in the gases from gas turbines operating with gas or liquid fuels. These gases are also characterized by oxides of nitrogen contents of a few tens to a few thousands of parts per million (ppm) and can contain comparable amounts of reducing compounds (CO, $H_2$, hydrocarbons) and sulphur, also large quantities of oxygen (1% to close to 20% by volume) and steam. The material of the invention can be used with HSVs (hourly space velocity, corresponding to the ratio of the volume of the monolith to the gas flow rate) for the exhaust gas generally in the range 500 to 150000 $h^{-1}$, for example in the range 5000 to 100000 $h^{-1}$.

It may be particularly advantageous to provide a mixture of at least two materials of the invention to combine the advantages of each with a restricted range over a wider temperature range. For the mixture of at least two materials of the invention, it is possible either to mix distinct powders of two materials and coat a monolith using a suspension of a mixture of the powder or to join two monoliths together, each monolith being coated with a suspension containing a single material.

The invention also concerns the use of materials for adsorbing and desorbing oxides of nitrogen in a process for eliminating oxides of nitrogen, more particularly in a medium that is super-stoichiometric in oxidising agents. Thus, the material of the invention can be used in a process comprising:
a step for adsorbing at least a portion of said oxides of nitrogen onto an adsorption material as defined in the present invention;
a step for desorbing the oxides of nitrogen carried out by increasing the temperature or by varying the composition of the exhaust gases;
a step for selective reduction of at least a portion of the oxides of nitrogen to molecular nitrogen by reducing agents in the presence of at least one catalyst for reducing oxides of nitrogen.

Thus, the process for eliminating oxides of nitrogen comprises, during the step for reducing the oxides of nitrogen, the use of a catalyst which is active and selective using reducing agents to reduce oxides of nitrogen to molecular nitrogen in a medium which is super-stoichiometric in oxidising agents. Catalysts for reducing oxides of nitrogen to nitrogen or nitrous oxide generally comprise at least one inorganic refractory oxide and can comprise at least one zeolite selected, for example, from MFI, NU-86, NU-87 and EU-1 zeolites and generally at least one element selected from elements from transition metal groups VIB, VIIB, VIII and IB. These catalysts can optionally contain at least one element selected from noble metals from group VIII, for example platinum, rhodium, ruthenium, iridium, palladium and optionally at least one element selected from elements from groups IIA, the alkaline-earths and IIIB, the rare earths. Examples of catalysts for reducing oxides of nitrogen include the following combinations: Cu-ZSM5, Cu-MFI, Fe-MFI, Fe-ZSM5, Ce-MFI, Ce-ZSM5, Pt-MFI, Pt-ZSM5.

The refractory inorganic oxide is selected from supports of the type $Al_2O_3$, $SiO_2$, $Zro_2$ and $TiO_2$, preferably alumina.

The reducing agents are selected from CO, $H_2$, hydrocarbons, present in the fuel or added in the form of fresh products.

In the case where the material for adsorbing oxides of nitrogen of the present invention contains at least one element (C) selected from noble metals from group VIII of the periodic table or contains, as at least element (M) and/or element (B), an element selected from transition metals and aluminium in addition to another element (B) preferably selected from alkali metals and alkaline-earth metals and a further element (M) generally constituted by manganese, the process for eliminating oxides of nitrogen comprises:

a step for adsorbing at least a portion of said oxides of nitrogen on the material as defined in the present invention;

a step for desorbing the oxides of nitrogen;

a step for selective reduction of at least a portion of the oxides of nitrogen to molecular nitrogen in the presence of reducing compounds on the material as defined in the present invention.

Thus, reducing oxides of nitrogen to nitrogen or nitrous oxide can take place directly on the adsorption material of the invention, which permits both trapping of the oxides of nitrogen, desorption of said oxides of nitrogen and reduction thereof.

NON-LIMITING EXAMPLES

Figure 1:
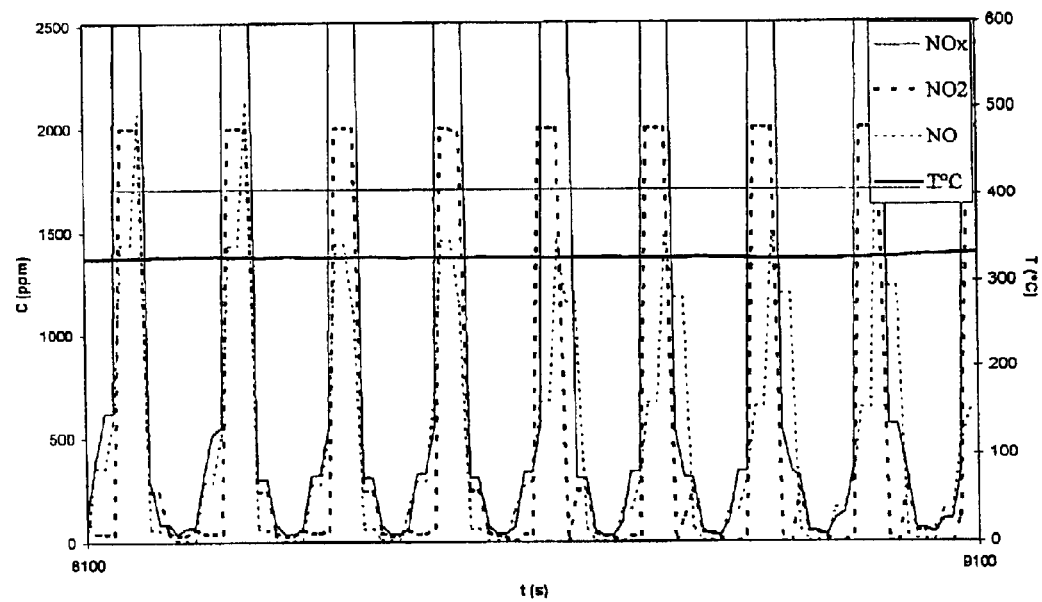
FIGS. 1 and 2 show gas content during generation of materials in accordance with the invention.

Examples 1 to 12, 16 and 17 below describe materials used to trap $NO_x$ in accordance with the invention.

Examples 13 to 15 describe prior art materials used to trap $NO_x$.

For comparison purposes, all of these catalysts were tested in the laboratory in a micro-unit with a synthetic gas mixture. The tests are described in examples 18, 19 and 20.

In all of the examples, the designation of the adsorbent phase deposited on the support (or substrate) corresponded to the sum of the elements constituting the material described in the above procedure after the loss on ignition, namely: the elements (M) contained in the centre of the oxygen octahedra, at least one element (B), and at least one optional precious metal (C).

The weight contents of the different elements constituting the adsorbent phase are shown in Table I as a percentage. The oxygen in the oxide phases is not taken into account in the material balance.

Example 1 (Invention)

A solution containing 165 g of manganese acetate dissolved in 600 ml of distilled water and 75 ml of acetic acid was added to a solution containing 100 g of potassium permanganate in 2.250 l of distilled water. The mixture was heated under reflux for 24 hours. The precipitate was filtered then it was washed and oven dried at 100° C. Before use, it was calcined in air at 600° C.

Example 2 (Invention)

A solution containing 165 g of manganese acetate dissolved in 600 ml of distilled water and 75 ml of acetic acid was added to a solution containing 100 g of potassium permanganate in 2.250 l of distilled water. The mixture was heated under reflux for 24 hours. The precipitate was filtered then it was washed with twice the volume of water used for synthesis and oven dried at 100° C. Before use, it was calcined in air at 600° C.

Example 3 (Invention)

A solution containing 165 g of manganese acetate dissolved in 600 ml of distilled water and 75 ml of acetic acid was added to a solution containing 115 g of barium manganate in 2.250 l of distilled water. The mixture was heated under reflux for 24 hours. The precipitate was filtered then it was washed until the washing water had the resistivity of water, then it was oven dried at 100° C. Before use, it was calcined in air at 600° C.

Example 4 (Invention)

A solution containing 165 g of manganese acetate dissolved in 600 ml of distilled water and 75 ml of acetic acid was added to a solution containing 100 g of potassium permanganate in 2.250 l of distilled water. A quantity of copper nitrate was then added so that the molarity of $Cu^{2+}$ ions was 0.05 M. The mixture was heated under reflux for 24 hours. The precipitate was filtered then it was washed until the washing water had the resistivity of water, then it was oven dried at 100° C. Before use, it was calcined in air at 600° C.

Example 5 (Invention)

A solution containing 165 g of manganese acetate dissolved in 600 ml of distilled water and 75 ml of acetic acid was added to a solution containing 100 g of potassium permanganate in 2.250 l of distilled water. A quantity of ferric nitrate was then added so that the molarity of $Fe^{3+}$ ions was 0.05 M. The mixture was heated under reflux for 24 hours. The precipitate was filtered then it was washed until the washing water had the resistivity of water, then it was oven dried at 100° C. Before use, it was calcined in air at 600° C.

Example 6 (Invention)

A solution containing 75 g of manganese acetate and 82.5 g of zinc acetate dissolved in 600 ml of distilled water and 75 ml of acetic acid was added to a solution containing 100 g of potassium permanganate in 2.250 l of distilled water. The mixture was heated under reflux for 24 hours. The precipitate was filtered then it was washed until the washing water had the resistivity of water, then it was oven dried at 100° C. Before use, it was calcined in air at 600° C.

Example 7 (Invention)

A solution containing 75 g of manganese acetate and 76.5 g of aluminium acetate dissolved in 600 ml of distilled water and 75 ml of acetic acid was added to a solution containing 100 g of potassium permanganate in 2.250 l of distilled water. The mixture was heated under reflux for 24 hours. The precipitate was filtered then it was washed until the washing water had the resistivity of water, then it was oven dried at 100° C. Before use, it was calcined in air at 600° C.

Example 8 (Invention)

Potassium nitrate, manganese nitrate and anatase were mixed to obtain a mixture with a molar composition of K:Mn:Ti=1.5:1.5:6.5. The powders were intimately ground and the mixture was calcined in air at 1000° C.

Example 9 (Invention)

Potassium nitrate, manganese nitrate and anatase were mixed to obtain a mixture with a molar composition of K:Mn:Ti=2:2:6. The powders were intimately ground and the mixture was calcined in air at 1000° C.

Example 10 (Invention)

150 ml of a solution containing manganese acetate and potassium acetate at a pH of 5 was added to 200 ml of a solution with a pH of 7.5 containing tetra-isopropyl ortho-titanate, tetramethylammonium hydroxide, hydrogen peroxide and acetic acid, all in proportions that could produce an atomic ratio of K:Mn:Ti=2:2:6. Tetramethylammonium hydroxide was added to raise the pH to 10. The excess solution was separated from the gel formed by centrifuging and the gel was oven dried at 100° C. Before use, it was calcined in air at 600° C.

Example 11 (Invention)

150 ml of a solution containing manganese, copper and potassium acetate at a pH of 5 was added to 200 ml of a solution with a pH of 7.5 containing tetra-isopropyl ortho-titanate, tetramethylammonium hydroxide, hydrogen peroxide and acetic acid, all in proportions that could produce an atomic ratio of K:Mn:Ti=2:1.5:1.5:5. Tetramethylammonium hydroxide was added to raise the pH to 10. The excess solution was separated from the gel formed by centrifuging, and the gel was oven dried at 100° C. Before use, it was calcined in air at 600° C.

Example 12 (Invention)

The catalyst of Example 1 was repeated, then impregnated with platinum in a proportion corresponding to 1% by weight. Platinum was deposited by dry impregnation from a solution of $Pt(NH_3)_4(NO_3)_2$.

Example 13 (Comparative)

A material for occluding $NO_x$ was prepared using the technique described in JP 9075714, with the following formulation: $K_{1.8}Zn_{0.9}Sn_{6.2}O_{16}$ and which had a hollandite structure (verified by X-ray diffraction) and a low specific surface area.

Example 14 (Comparative)

A material for occluding $NO_x$ was prepared using the technique described in JP 9075714, with the following formulation: $K_{1.8}Zn_{0.9}Sn_{6.2}O_{16}$ and which had a hollandite structure (verified by X-ray diffraction) and a relatively high specific surface area.

Example 15 (Comparative)

The material with formula $PtBaLa—CeO_2—Al_2O_3—TiO_2$ as described in European patent application EP-A-0 666 103 was used to trap $NO_x$ by nitrate formation.

Example 16 (Invention)

Three solutions were mixed, one containing 20 g of manganese acetate and 3.5 g of magnesium acetate dissolved in 140 ml of water, another containing 80 g of sodium hydroxide dissolved in 140 ml of water, and the third containing 5 g of potassium permanganate in 140 ml of water. The suspension was allowed to mature at ambient temperature for 12 hours, then it was filtered and washed. It was then introduced into 500 ml of a solution containing barium chloride (0.5 M). The assembly was stirred then introduced into an autoclave and was heated to 200° C. for 10 days under autogenous pressure. The product obtained was filtered, washed until there were no more chloride ions in the wash solution, then oven dried at 100° C. Before use, it was calcined in air at 550° C.

Example 17 (Invention)

Three solutions were mixed, one containing 20 g of manganese acetate and 3.5 g of magnesium acetate dissolved in 140 ml of water, another containing 80 g of sodium hydroxide dissolved in 140 ml of water and the third containing 5 g of potassium permanganate in 140 ml of water. The suspension was allowed to mature at ambient temperature for 12 hours, then it was filtered and washed. It was then introduced into 500 ml of a solution containing magnesium acetate (1 M). The assembly was stirred then introduced into an autoclave and was heated to 150° C. for 48 hours under autogenous pressure. The product obtained was filtered, washed, then oven dried at 100° C. Before use, it was calcined in air at 550° C.

TABLE I

Composition by weight of materials prepared in Examples 1 to 17

| Ex. | Materials | Structure | $S_{BET}$ ($m^2/g$) | K | Mg | Ba | La | Ce | Cu | Fe | Zn | Mn | Sn | Ti | Al | Pt |
|---|---|---|---|---|---|---|---|---|---|---|---|---|---|---|---|---|
| Ex 1 (inv) | K1-Mn8 | OMS2x2 | 75 | 5.0 | | | | | | | | 60.0 | | | | |
| Ex. 2 (inv) | K2-Mn8 | OMS2x2 | 48 | 9.8 | | | | | | | | 53.8 | | | | |
| Ex. 3 | Ba—Mn | OMS2x2 | 97 | | | 15.9 | | | | | | 49.2 | | | | |
| Ex. 4 | KCu—Mn | OMS2x2 | 97 | 4.0 | | | | | 3.6 | | | 53.3 | | | | |
| Ex. 5 | KFe—Mn | OMS2x2 | 60 | 4.8 | | | | | | 6.7 | | 52.6 | | | | |
| Ex. 6 | K—ZnMn | OMS2x2 | 62 | 3.7 | | | | | | | 5.8 | 57.5 | | | | |
| Ex. 7 | K—AlMn | OMS2x2 | 259 | 1.2 | | | | | | | | 47.9 | | | 10.9 | |

TABLE I-continued

Composition by weight of materials prepared in Examples 1 to 17

| Ex. | Materials | Structure | $S_{BET}$ (m²/g) | K | Mg | Ba | La | Ce | Cu | Fe | Zn | Mn | Sn | Ti | Al | Pt |
|---|---|---|---|---|---|---|---|---|---|---|---|---|---|---|---|---|
| Ex. 8 | K1.5Mn1.5Ti6.5 | OMS2x2 | 2 | 8.0 | | | | | | | | 11.5 | | 41 | | |
| Ex. 9 | K2Mn2Ti | OMS2x2 | 2 | 10 | | | | | | | | 13.6 | | 37 | | |
| Ex. 10 | K2Mn2Ti | OMS2x2 | 44 | 9.6 | | | | | | | | 10.6 | | 38 | | |
| Ex. 11 | K2Mn1.5Cu1.5Ti | OMS2x2 | 15 | 9.5 | | | | | 12.3 | | | 11.3 | | 30.2 | | |
| Ex. 12 (inv) | 1.Pt/K—Mn | OMS2x2 | 74 | 4.7 | | | | | | | | 59.1 | | | | 1 |
| Ex. 13 (comp) | Hollandite K—SnZn low surface | OMS2x2 | 4 | 11.2 | | | | | | | 9.4 | | 58.9 | | | |
| Ex. 14 (comp) | Hollandite K—SnZn high surface | OMS2x2 | 80 | 11.2 | | | | | | | 9.4 | | 58.9 | | | |
| Ex. 15 (comp) | PtBaLaCe/Al2O3—TiO2 | — | 120 | | | 18 | 3 | 11 | | | | | | 8.5 | 18.1 | 0.5 |
| Ex. 16 (inv) | Ba—Mn | OMS2x3 | 51 | | | 24 | | | | | | 48 | | | | |
| Ex. 17 (inv) | Mg—Mn | OMS3x3 | 84 | | 24.8 | | | | | | | 33.0 | | | | |

Example 18

Results of Thermal Adsorption-Desorption Tests for Oxides of Nitrogen

The test materials were installed in a micro-reactor placed in the centre of a furnace. They underwent pre-treatment at 600° C. for 5 hours in a gas mixture constituted by nitrogen containing 18.5% of $O_2$ and 4% of $H_2O$. With the same mixture, these materials were brought to the adsorption temperature ($T_{ads}$) when a gaseous mixture containing oxides of nitrogen was passed for 30 minutes.

| | |
|---|---|
| Hourly space velocity (HSV) | 5000 h⁻¹ |
| Composition of mixture | |
| | $NO_x$ 800 ppm: NO 650 ppm, $NO_2$ 150 ppm |
| | $O_2$ 18.5% |
| | $H_2O$ 4% |
| | $N_2$ complement to 100% |

After twenty minutes of adsorption, the supply of oxides of nitrogen was cut off and the materials were heated to desorb the $NO_x$:

| | |
|---|---|
| Hourly space velocity (HSV) | 5000 h⁻¹ |
| Composition of mixture | |
| | $O_2$ 18.5% |
| | $H_2O$ 4% |
| | $N_2$ complement to 100% |
| Desorption temperature range | From $T_{ads}$ to 600° C. |
| Temperature change | 10° C./min |

Table II below shows the values indicating the quantity of oxides of nitrogen adsorbed and the desorption temperature of these oxides.

TABLE II

Results of micro-unit adsorption and desorption tests. Influence of formulation

| Ex. | Materials with OMS2x2 structure | Adsorption capacity estimated from desorption peak mgNO/g | | | | | $T_{des}$ (° C.) |
|---|---|---|---|---|---|---|---|
| | | $T_{ads}$ 50° C. | $T_{ads}$ 150° C. | $T_{ads}$ 200° C. | $T_{ads}$ 300° C. | $T_{ads}$ 400° C. | |
| 1 (inv) | K—Mn | 3.3 | 3 | 3.6 | 3.6 | 1.9 | 340 |
| 2 (inv) | K2-Mn | Nm | 12.1 | 20.8 | 17.8 | Nm | 320 + 420 |
| 3 (inv) | BalMn | 3.4 | 4.1 | 3.7 | 3.2 | Nm | 440 |
| 4 (inv) | KCu—Mn | Nm | 2.4 | 3.0 | 1.5 | Nm | 300 + 380 |
| 5 (inv) | KFe—Mn | Nm | 1.5 | 1.1 | 1.1 | Nm | 330 |
| 6 (inv) | K—ZnMn | Nm | 2.1 | 3.2 | 1.8 | Nm | 370 |
| 7 (inv) | K—AlMn | 6.0 | 2.9 | 2.5 | Nm | Nm | 300 |
| 14 (comp) | K—ZnSn | Nm | 1.3 | 2.0 | 1.2 | Nm | 410 |

Nm: not measured

It can be seen that the materials of the invention were more effective as regards adsorption of oxides of nitrogen than the material of Example 14 tested by way of comparison. The adsorption capacity was high over a wide temperature range. An analysis of the gas at the micro-reactor outlet showed that up to their saturation point, the materials of the invention adsorb all of the $NO_x$ (NO or $NO_2$) with which they come into contact between 50° C. and the desorption temperature, and for this reason the materials of the present invention have good adsorption properties, even in the absence of an oxidising phase (for example supported Pt).

The materials of the invention thus have the advantage of being highly adsorbent, without the constraints of the presence of platinum. In particular, the claimed materials exhibit a relatively low oxides of nitrogen desorption temperature, suitable for application in an exhaust line for a diesel engine. The temperature at which the materials of the invention are desorbed is generally lower than that of the material of Example 14 ($T_{des}$=410° C.). However, the material BaIMn of Example 3 was desorbed at 440° C. but exhibited a better adsorption capacity than that of the material of Example 14.

Comparing the results of Examples 1 and 2, it can be seen that the material with two potassium cations per elementary unit (Example 2) has an adsorption capacity that is four or five times higher than that of the material that contains only one K+ per elementary unit.

The $NO_x$ desorption temperature can be modified by acting on the nature of cation B (Example 1, where B is potassium and $T_{des}$=340° C. and Example 3, where B is barium and $T_{des}$=440° C.).

TABLE III

Results of adsorption and desorption tests.
Influence of structure

| Ex. | Materials | Structure | Adsorption capacity estimated from desorption peak (mgNO/g) | | | | | $T_{des}$ (° C.) |
| --- | --- | --- | --- | --- | --- | --- | --- | --- |
| | | | $T_{ads}$ 50° C. | $T_{ads}$ 150° C. | $T_{ads}$ 200° C. | $T_{ads}$ 300° C. | $T_{ads}$ 400° C. | |
| 3 | Ba—Mn | OMS2x2 | 3.4 | 4.1 | 3.7 | 3.2 | Nm | 440 |
| 16 | BaMn | OMS2x3 | 2.4 | 2.9 | 3.3 | 3.2 | Nm | 425 |
| 17 | Mg—Mn | OMS3x3 | 2.1 | 3.0 | 3.5 | 3.2 | Nm | 445 |
| 14 comp | K—ZnSn | OMS2x2 | Nm | 1.3 | 2.0 | 1.2 | Nm | 410 |

The material BaMn, with structure type OMS2*3, exhibited an adsorption capacity that was slightly lower than that of the BaMn material with structure type OMS2*2.

The adsorption capacity of the materials with structure type OMS2*3 and 3*3 was higher than that of comparative material 14.

TABLE IV

Results of micro-unit adsorption and desorption tests.
Influence of presence of plurality of metals as element M

| Ex. | Materials | Adsorption capacity estimated from desorption peak (mgNO/g) | | | | | $T_{des}$ (° C.) |
| --- | --- | --- | --- | --- | --- | --- | --- |
| | | $T_{ads}$ 50° C. | $T_{ads}$ 150° C. | $T_{ads}$ 200° C. | $T_{ads}$ 300° C. | $T_{ads}$ 400° C. | |
| 1 (inv) | K—Mn | 3.3 | 3 | 3.6 | 3.6 | 1.9 | 340 |
| 8 | K1.5-Mn1.5Ti6.5 Small surface | Nm | 1.0 | 1.0 | 0.3 | Nm | 250 |
| 9 | K2-Mn2Ti6 Small surface | Nm | 1.4 | 5.7 | 0.4 | Nm | 300 + 580 |
| 10 | K2-Mn2Ti6 High surface | Nm | 2.8 | 7.4 | 2.1 | Nm | 280 + 510 |
| 11 | K2-Mn1.5Cu1.5Ti5 High surface | Nm | 5.3 | 9.4 | 8.0 | Nm | 270 + 515 |

The results of Table IV show that materials containing mainly Ti as element M have advantageous $NO_x$ adsorption capacities, even with a very low specific surface area (2 m²/g for the materials of Examples 8 and 9). As in the case of the solids of Examples 1 and 2, it can be seen for the solids of Examples 8 and 9 that when the content of element B is increased, the sorptive capacity is also increased.

The results of Examples 9 and 10 show that an increase in specific surface area is beneficial since an increase in adsorption capacity is observed along with a reduction in desorption temperatures.

Inserting copper into the framework in place of titanium further increases the adsorption capacity of the material (Example 11).

With the exception of the materials of Examples 12 and 15 which already contained platinum in their composition, the results shown in Table V below marked "+Pt/SiO₂" are those of materials to which a Pt/SiO₂ phase had been added, equivalent to a weight percentage of 1% with respect to the total mass of the mixture. It was verified that, under our conditions, this Pt/SiO₂ phase did not act as an adsorbing mass for oxides of nitrogen and the capacity was calculated in mg of NO per unit mass of trap.

of Example 15 (which contains PT), and desorbs them at lower temperatures.

Example 19

Results of Adsorption—Desorption Tests by Varying the Relative Gas Mixture Strength The test materials were installed in a micro-reactor placed in the centre of a furnace. They underwent pre-treatment at 600° C. for 5 hours in a gas mixture constituted by nitrogen containing 18.5% of 02 and 4% of $H_2O$ then were brought to 50° C. in the same mixture. A gas containing oxides of nitrogen the composition of which was transitory was then passed over the materials, the gas being alternately composed of a mixture that was lean in hydrocarbons for 110 seconds then a mixture that was rich in hydrocarbons for 10 seconds, and were brought to different temperature stages in the range 50° C. to 600° C. (typically 50, 120, 190, 265, 335, 410, 485 and 560° C.). Generally, after the 560° C. stage, the temperature was reduced to the stage at which the material showed the best efficiency to carry out a return point and check whether the capacities of the materials had been affected by high temperature treatments in a gas rich mixture.

TABLE V

Results of micro-unit adsorption and desorption tests.

| Ex. | Materials | Adsorption capacity estimated from desorption peak (mgNO/g) | | | | | |
|---|---|---|---|---|---|---|---|
| | | $T_{ads}$ 50° C. | $T_{ads}$ 150° C. | $T_{ads}$ 200° C. | $T_{ads}$ 300° C. | $T_{ads}$ 400° C. | $T_{des}$ (° C.) |
| 1 (inv) | K—Mn | 3.3 | 3 | 3.6 | 3.6 | 1.9 | 340 |
| 12 | Pt/K—Mn | 1.9 | 2.9 | 3.0 | 2.2 | Nm | 375 |
| 1 | K—Mn + Pt/SiO₂ | 3.3 | 3.5 | 3.0 | 2.5 | Nm | 340 |
| 3 | Ba—Mn | 3.4 | 4.5 | 3.7 | 3.2 | Nm | 425 |
| 3 | Ba—Mn + Pt/SiO₂ | 3.8 | 3.0 | 2.5 | 1.3 | Nm | 320 |
| 9 | K2-Mn2Ti6 Small surface | Nm | 1.4 | 5.7 | 0.4 | Nm | 300 + 580 |
| 9 | K2-Mn2Ti6 small surface + Pt/SiO₂ | Nm | 3.6 | 1.9 | 4.3 | Nm | 210 + 450 |
| 10 | K2-Mn2Ti6 high surface | Nm | 2.8 | 7.4 | 2.1 | Nm | 280 + 510 |
| 10 | K2-Mn2Ti6 high surface + Pt/SiO₂ | Nm | 4.5 | 2.5 | 5.2 | Nm | 200 + 450 |
| 11 | K2-Mn1.5Cu1.5Ti5 high surface | Nm | 5.3 | 9.4 | 8.0 | Nm | 270 + 450 |
| 11 | K2-Mn1.5Cu1.5Ti5 high surface + Pt/SiO₂ | Nm | 4.5 | 4.8 | 6.8 | Nm | 240 + 450 |
| 15 | PtBaLaCe/Al₂O₃—TiO₂ (comp) | Nm | Nm | 6.1 | Nm | 8.2 | 570 |

The presence of a noble metal in the composition of the materials of the invention has no significant influence on the adsorption capacities of the materials and the manner in which the noble metal is introduced also has no influence. It thus appears that the materials of the invention have no need for this oxidation catalyst (in lean burn) to improve the adsorption of oxides of nitrogen. However, a slight reduction in the oxides of nitrogen desorption temperatures is observed when platinum is present.

It should be noted that without platinum, the materials of Example 2 (Table II), 10 and 11 adsorb more $NO_x$ than that

| Hourly space velocity (HSV) | 5000 h⁻¹ |
|---|---|
| Composition of lean mixture (R = 0.3) | |
| | $NO_x$ 1750 ppm: NO 1400 ppm, $NO_2$ 350 ppm |
| | $O_2$ 18.5% |
| | $H_2O$ 4% |
| | $N_2$ complement to 100% |
| Composition of rich mixture (R = 1.2) | |

-continued

C$_2$H$_4$ 2%
H$_2$O 2%
N$_2$ complement to 100%

The accompanying FIG. 1 shows the mode of operation of the material of Example 1 at the 330° C. stage. From 190° C., injection of a hydrocarbon-rich gas eliminated all of the NO$_x$ which had previously been desorbed during the lean operation mode by desorption or desorption followed by adsorption.

For each of the materials cited in the Example, Table VI compares the NO$_x$ adsorption efficacy in the first sixty seconds in lean operation mode. The quantity of NO$_x$ injected during each of these 60 second periods in lean operation is equivalent to 1.2 mg of NO per gram of trap.

TABLE VI

Results of lean operation efficiency during richness variation tests

| Material Example | Efficiency (%) during first 60 seconds in lean operation of NO$_x$ trap at different temperature stages | | | | |
|---|---|---|---|---|---|
| | 190° C. | 265° C. | 335° C. | 410° C. | 485° C. |
| 1 | 10 | 35 | 90 | 80 | 50 |
| | | | 90* | | |
| 1 + Pt/SiO$_2$ | 40 | 70 | 80 | 65 | 50 |
| 3 | 35 | 70 | 80 | 60 | 45 |
| | | | 85* | | |
| 3 + Pt/SiO$_2$ | 37 | 58 | 70 | 47 | 32 |
| 4 | 15 | 60 | 60 | 45 | 19 |
| | | | 65* | | |
| 5 | 15 | 50 | 65 | 37 | 20 |
| | | | 80* | | |
| 6 | 16 | 74 | 80 | 42 | 21 |
| | | | 85* | | |
| 6 + Pt/SiO$_2$ | 55 | 75 | 65 | 30 | 15 |
| 7 | 8 | 65 | 58 | 31 | 19 |
| | | 70* | | | |
| 7 + Pt/SiO$_2$ | 53 | 79 | 56 | 30 | 17 |
| 12 (formulation initially containing Pt) | 22 | 85 | 70 | 56 | 22 |
| | | 95* | | | |
| 14 (comp) | 8 | 8 | 10 | 12 | 15 |
| | | | 10* | | |
| 15 (comp) | 11 | 19 | 65 | 80 | 70 |
| | | | | 80* | |
| 16 (inv) | 5 | 21 | 67 | 56 | 40 |
| | | | 42* | | |
| 17 (inv) | 0 | 13 | 47 | 71 | 50 |
| | | | 30* | | |

*return point after last stage at 560° C.

Within the context of operation with chemical regeneration, it can be seen that for temperatures of 400° C. or less, many of the materials of the invention with or without platinum adsorbed the maximum amount of oxides of nitrogen with a maximum efficiency achieved at temperatures of close to 250–350° C. (Examples 1, 3, 4, 5 and 6). In contrast, for the materials of Examples 16 and 17 with an OMS 2*3 and OMS 3*3 structure respectively, it can be seen that the adsorption capacity is reduced with respect to the materials of the invention with an OMS 2*2 structure but is higher than that obtained with the material of Example 14 containing no Pt, the materials of Examples 16 and 17 also containing no Pt. The optimum efficiency of materials 16 and 17 was obtained for temperatures higher than those of the materials with structure OMS 2*2, which is less advantageous for application to a diesel engine. By observing the efficiency of the return point for the different materials of the invention, it can be seen that the materials of Examples 16 and 17 partially degrade in a rich medium at high temperatures (T>550° C.).

In the configuration whereby the richness is varied, for the same material, the presence of a noble metal appears to improve adsorption at low temperatures (materials of Examples 1, 6 and 7). In the case of Example 1, this phenomenon is observed when the metal is added alongside the trap (mixture with a Pt/SiO$_2$ phase) or deposited directly on the trap (Example 12).

TABLE VII

Results of global efficiency representing the amount of NO$_x$ eliminated over the poor-rich cycle set at each temperature stage

| Material Example | Global NO$_x$ efficiency (%) at different temperature stages | | | | |
|---|---|---|---|---|---|
| | 190° C. | 265° C. | 335° C. | 410° C. | 485° C. |
| 1 | Nm | 10 | 10 | 0 | 0 |
| 3 | 0 | 10 | 12 | 3 | 0 |
| 4 | 0 | 6 | 10 | 6 | 11 |
| 5 | 0 | 10 | 36 | 24 | 9 |
| 6 | 0 | 5 | 24 | 25 | 10 |
| 7 | Nm | 23 | 39 | 24 | 9 |
| 10 | 0 | 0 | 0 | 2 | 4 |
| 11 | 0 | 5 | 9 | 15 | 3 |

The materials of Examples 5, 6 and 7 with iron, zinc and aluminium respectively inserted into the framework of the OMS with structure 2*2, demonstrate that they eliminate NO$_x$ by reduction during the rich mixture phase, while the materials of Examples 1 and 2 truly act as an NO$_x$ trap, i.e., the majority or all of the adsorbed NO$_x$ is desorbed.

For the KFeMn material of Example 5, it can be seen, for example, that 55% of the NO$_x$ is directly reduced at 335° C. while only 11% is reduced for the material of example 1 and that beyond that, all of the NO$_x$ is eliminated by desorption, which thus necessitates adding an NO$_x$ reduction catalyst.

Figure 2:
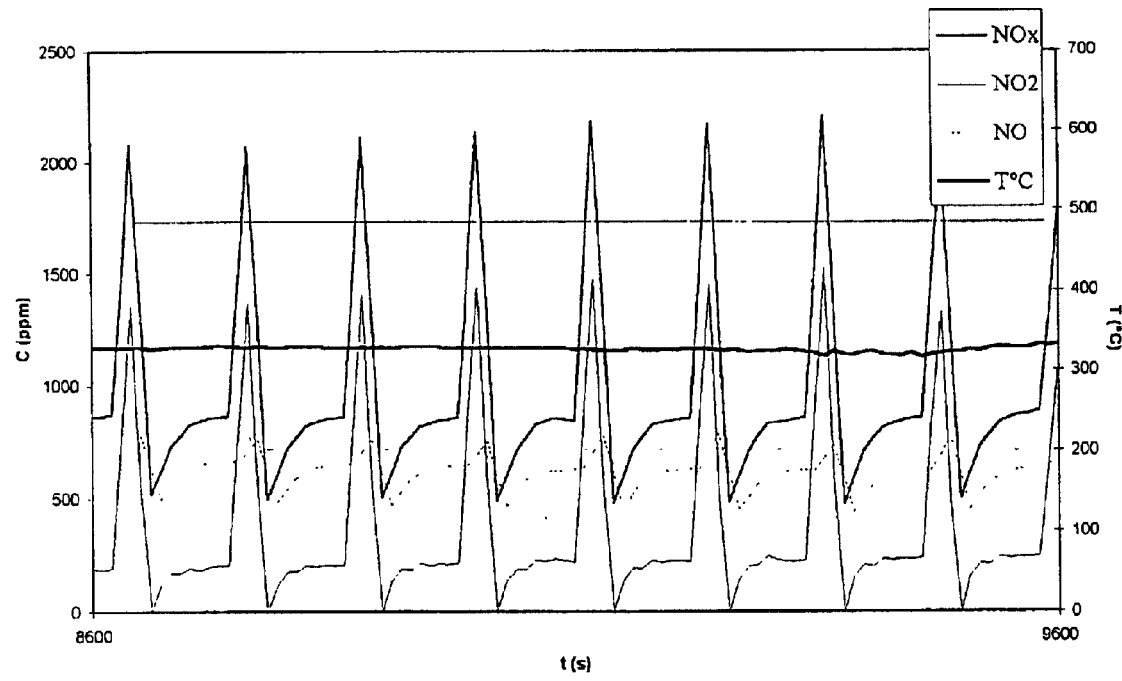

FIG. 2 shows the operating mode of the material of Example 5 at the 330° C. stage. Unlike the material of Example 1 (see FIG. 1), the material of Example 5 has a NO$_x$ reduction activity when in the rich mixture phase.

Example 20

Results of Adsorption and Thermal Desorption of NO$_x$ in the Presence of Sulphur-Containing Molecules The test materials were installed in a micro-reactor placed in the centre of a furnace. They underwent a pre-treatment at 600° C. for 5 hours in a gas mixture constituted by nitrogen containing 18.5% O$_2$ and 4% H$_2$O. Under the same mixture, these materials were brought to a temperature of 200° C., where they were traversed for 20 minutes by a gas mixture containing oxides of nitrogen and sulphur dioxide.

| Hourly space velocity (HSV) | 5000 h$^{-1}$ |
|---|---|
| Composition of mixture | |
| | NO$_x$ 800 ppm: NO 650 ppm, |

-continued

| | |
|---|---|
| | $NO_2$ 150 ppm |
| | $SO_2$ 50 ppm |
| | $O_2$ 18.5% |
| | $H_2O$ 4% |
| | $N_2$ complement to 100% |

After twenty minutes of adsorption, the supply of oxides of nitrogen and sulphur was cut off and the materials were heated to desorb the $NO_x$:

| | |
|---|---|
| Hourly space velocity (HSV) | 5000 h$^{-1}$ |
| Composition of mixture | |
| | $O_2$ 18.5% |
| | $H_2O$ 4% |
| | $N_2$ complement to 100% |
| Desorption temperature range | 200° C. to 600° C. |
| Temperature change | 10° C./min |

They then underwent a second adsorption and desorption series.

Table VIII below indicates, for the materials of Example 1, the quantity of oxides of nitrogen adsorbed and the desorption temperatures of these oxides in the presence or absence of sulphur dioxide.

TABLE VIII

Sulphur sensitivity evaluation

| | | 1st adsorption | | 2nd adsorption | |
|---|---|---|---|---|---|
| Examples | HSV (h$^{-1}$) | Capacity at 200° C. (mgNO/g) | $T_{des}$ (° C.) | Capacity at 200° C. (after desorption at 600° C.) (mgNO/g) | $T_{des}$ (° C.) |
| 1 (inv) | 5000 no $SO_2$ | 3.6 | 350 & 425 | 3.5 | 350 & 425 |
| 1 (inv) | 5000 with $SO_2$ | 3.2 | 355 & 420 | 3.1 | 350 & 415 |
| 15 (comp) | 5000 no $SO_2$ | 6.1 | 570 | 5.7 | 570 |
| 15 (comp) | 5000 with $SO_2$ | 4.1 | 560 | 3.0 | 560 |

The adsorption capacity for oxides of nitrogen of the materials of Example 1 was only reduced by 10% to 15% in the presence of sulphur dioxide, as opposed to 33% for the prior art material of Example 15.

The desorption temperatures of the trapped oxides of nitrogen were substantially equal to the temperatures obtained during the no-sulphur experiments.

However, the materials of Example 1 regained all of their initial adsorption capacity after thermal desorption at 600° C. (the capacity during the second adsorption was substantially equal to the capacity of the first adsorption), which was not the case for the compound of Example 15. The $NO_x$ traps claimed by the Applicant thus have the major advantage of being capable of ready regeneration following contact with oxides of sulphur while the materials functioning to trap $NO_x$ by nitrate formation (Example 15) are poisoned by sulphate species that are extremely stable thermally.

The preceding examples can be repeated with similar success by substituting the generically or specifically described reactants and/or operating conditions of this invention for those used in the preceding examples.

The entire disclosures of all applications, patents and publications, cited above or below, and of corresponding French application No. 99/14.144, filed Nov. 10, 1999, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A material for eliminating oxides of nitrogen from exhaust gases, from internal combustion engines, said material having a OMS2*2, OMS 2*3 or OMS 3*3 structure, and being formed from $MO_6$ octahedra connected together such that the structure generates micropores in the form of channels, said octahedra comprising at least one element (M) selected from groups IIIB, IVB, VB, VIB, VIII, IB, IIB or IIIA of the periodic table and germanium, said octahedra excluding tin, said material further comprising at least one element (B) selected from the group consisting of alkali-metals, alkaline-earth metals, rare earth elements, transition metals and elements from groups IIIA, IVA of the periodic table.

2. A material according to claim 1, having an the average valence of the metals (M) of about +4.

3. A material according to claim 1, wherein least a major portion of element (M) is manganese, aluminum, zirconium, titanium, zinc, copper, iron or mixtures of at least two of said elements.

4. A material according to claim 3, comprising a minor quantity of at least one element (M) which is aluminum, zinc, copper, nickel, cobalt, iron, gallium, manganese or mixtures of at least two said elements.

5. A material according to claim 4, wherein the major portion of element (M) is titanium, with manganese representing the minor quantity of said element (M).

6. A material according to claim 1, wherein element (B) is potassium, barium, strontium, iron, copper, zinc, aluminum, magnesium, rubidium, calcium, or mixtures of at least two of said elements.

7. A material according to claim 1, further comprising at least one noble metal (C) from group VIII of the periodic table.

8. A material according to claim 7, wherein said noble metal (C) is platinum.

9. A material according to claim 1, comprising as a percentage by weight:
   30% to 80% of at least one metal (M);
   0.01% to 30% of at least one element (B);
   optionally, 0.05% to 5% of at least one metal (C), the complement by weight being supplied by the oxygen of oxide bonds.

10. A material according to claim 1, having a its specific surface area of 1 to 300 m²/g.

11. A material according to claim 1, having structure OMS2*2.

12. A material according to claim 1, wherein that manganese constitutes at least a portion of element (M), an alkali or alkaline-earth metal constitutes at least a portion of element (B), at least one transition metal or aluminum constituting the remainder of element (M) and/or element (B).

13. A material according to claim 12, having the formula KFeMn, KAlMn or KZnMn.

14. A material according to claim 1, having at least one porous support.

15. A material according to claim 14, wherein the porous support is $SiO_2$, $Al_2O_3$, $TiO_2$, $ZrO_2$, SiC, MgO or an aluminosilicate.

16. A material according to claim 1, having at least one rigid support.

17. A material comprising at least two materials according to claim 1.

18. In a process for eliminating oxides of nitrogen comprising adsorbing oxides of nitrogen on an adsorption material, the improvement comprising conducting the adsorption at a temperature of 50° C. to 450° C. in contact with a material according to claim 1.

19. A process according to claim 18 in a process for eliminating oxides of nitrogen, further comprising desorbing the oxides of nitrogen by raising the temperature.

20. A process according to claim 19, wherein thermal desorption of the oxides of nitrogen is carried out at a temperature of 250° C. to 500° C.

21. A process according to claim 18 in a process for eliminating oxides of nitrogen, further comprising desorbing the oxides of nitrogen by varying the gas composition.

22. A process according to claim 21, wherein chemical desorption of the oxides of nitrogen is carried out at a temperature of 150° C. to 500° C.

23. A process according to claim 18 in a process for eliminating oxides of nitrogen, further comprising reducing oxides of nitrogen to molecular nitrogen and/or nitric oxide.

24. A process according to claim 23, in which reduction of the oxides of nitrogen takes place in the presence of a catalyst comprising at least one inorganic refractory oxide, optionally at least one zeolite, at least one transition metal from groups VIB, VIIBA, VIII or IB, optionally at least one noble metal from group VIII, and optionally at least one alkaline-earth of IIA, and/or rare earth of group IIIB.

25. A process according to claim 24, in which adsorbing oxides of nitrogen, desorbing oxides of nitrogen and reducing oxides of nitrogen takes place in the presence of at least one metal (C) from group VIII of the periodic table.

26. A process according to claim 18, wherein an exhaust gas from an internal combustion engine comprises the oxides of nitrogen to be adsorbed.

27. A process according to claim 26, wherein the internal combustion engine is a diesel engine.

* * * * *